(12) United States Patent
Burton, Jr.

(10) Patent No.: US 8,142,757 B2
(45) Date of Patent: Mar. 27, 2012

(54) METHOD FOR MAKING BOROSILICATE ZSM-48 MOLECULAR SIEVES

(75) Inventor: Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 273 days.

(21) Appl. No.: 12/612,824

(22) Filed: Nov. 5, 2009

(65) Prior Publication Data

US 2011/0105302 A1   May 5, 2011

(51) Int. Cl.
 *C01B 39/04*  (2006.01)
 *C01B 39/46*  (2006.01)
 *C01B 39/48*  (2006.01)

(52) U.S. Cl. ............. 423/708; 423/718; 502/66; 502/71

(58) Field of Classification Search .................. 423/708, 423/718; 502/66, 71
See application file for complete search history.

(56) References Cited

U.S. PATENT DOCUMENTS

| | | | | |
|---|---|---|---|---|
| 4,397,827 A * | 8/1983 | Chu | | 423/705 |
| 4,423,021 A * | 12/1983 | Rollmann et al. | | 423/708 |
| 5,187,132 A | 2/1993 | Zones et al. | | |
| 5,316,753 A | 5/1994 | Nakagawa | | |
| 5,425,933 A | 6/1995 | Nakagawa | | |
| 5,641,393 A | 6/1997 | Nakagawa | | |
| 5,961,951 A | 10/1999 | Kennedy et al. | | |
| 5,972,204 A * | 10/1999 | Corma Canos et al. | | 208/114 |
| 6,923,949 B1 | 8/2005 | Lai et al. | | |
| 7,157,075 B1 * | 1/2007 | Burton et al. | | 423/705 |
| 7,550,405 B2 | 6/2009 | Shan et al. | | |
| 8,003,074 B2 * | 8/2011 | Lai et al. | | 423/704 |
| 2007/0032692 A1 | 2/2007 | O'Rear et al. | | |
| 2009/0076317 A1 * | 3/2009 | Lai et al. | | 585/852 |

FOREIGN PATENT DOCUMENTS

WO   2009038740   3/2009

* cited by examiner

*Primary Examiner* — David M Brunsman
(74) *Attorney, Agent, or Firm* — Michael D. Ross

(57) ABSTRACT

The present invention is directed to a borosilicate ZSM-48 molecular sieve having a mole ratio of between 40 and 400 of silicon oxide to boron oxide, synthesized using novel structure directing agents. Also disclosed are processes using a borosilicate ZSM-48 as a catalyst for the selective hydroconversion of heavy normal paraffins into lighter normal paraffin products, with minimal formation of isoparaffins.

14 Claims, 12 Drawing Sheets

METHOD FOR MAKING BOROSILICATE ZSM-48 MOLECULAR SIEVES

FIELD OF THE INVENTION

The present invention is directed to borosilicate ZSM-48, methods for preparing borosilicate ZSM-48, and uses for borosilicate ZSM-48.

BACKGROUND OF THE INVENTION $C_{5+}$ liquids rich in normal paraffins (n-paraffins) are ideally suited for several applications, including use as solvents, feedstocks for ethylene production, jet fuel and jet fuel blend components, diesel fuel and diesel fuel blend components, feedstocks for isomerization to make lubricants, and the like.

Historically, $C_{5+}$ liquids rich in normal paraffins have been prepared by selectively extracting normal paraffins from mixtures, such as petroleum. This operation is relatively expensive and is limited to the content of normal paraffins in the feedstock.

Normal paraffins can also be produced in a Fischer-Tropsch process. However, the Fischer-Tropsch process also generates heavy products that can fall outside the range of use for the above applications. If these heavy products are converted into lighter products by hydrocracking over conventional acidic catalysts, an isoparaffin-rich product will be obtained, instead of the desired normal paraffin-rich product.

Accordingly, there is a continuing need for new catalyst compositions suitable for use in hydrocarbon conversion processes, including catalysts which are n-paraffin selective.

SUMMARY OF THE INVENTION

In accordance with the present invention there is provided a borosilicate ZSM-48 molecular sieve having a mole ratio of between 40 and 400 of silicon oxide to boron oxide and having, after calcination, the powder X-ray diffraction (XRD) lines of Table 4.

The present invention also includes a method for preparing a borosilicate ZSM-48 by contacting under crystallization conditions: (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by the following structure (1):

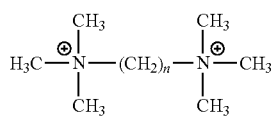

(1)

wherein n is an integer of from 8 to 12, inclusive.

The present invention also includes a borosilicate ZSM-48 having a mole ratio of between 40 and 400 of silicon oxide to boron oxide and having, after calcination, the powder XRD lines of Table 4 herein below, wherein the molecular sieve is prepared by contacting under crystallization conditions: (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by structure (1), wherein n is an integer of from 8 to 12, inclusive.

The present invention also includes a borosilicate ZSM-48 having a composition, as-synthesized and in the anhydrous state, in terms of mole ratios, as follows:

|  | Broad | Preferred |
|---|---|---|
| $SiO_2/B_2O_3$ | 40-400 | 40-200 |
| $Q/SiO_2$ | 0.01-0.05 | 0.01-0.04 | wherein Q is a structure directing agent represented by structure (1).

Where the molecular sieve formed is an intermediate material, the process of the present invention includes a further post-synthesis processing in order to achieve the target molecular sieve.

In another aspect, the present invention includes a process for converting hydrocarbons by contacting a hydrocarbonaceous feed under hydrocarbon converting conditions with a borosilicate ZSM-48 molecular sieve having a mole ratio of between 40 and 400 of silicon oxide to boron oxide and having, after calcination, the powder XRD lines of Table 4.

In another aspect, the present invention provides a process for hydroconverting hydrocarbons, the process comprising contacting a hydrocarbonaceous feed under hydrocarbon converting conditions with a borosilicate ZSM-48 molecular sieve having a mole ratio of between 40 and 400 of silicon oxide to boron oxide and having, after calcination, the powder XRD lines of Table 4 herein below, wherein the molecular sieve is prepared by contacting under crystallization conditions (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by structure (1), wherein n is an integer of from 8 to 12, inclusive.

In accordance with the present invention, there is further provided a process for selectively hydroconverting $C_{10+}$ n-paraffins in a hydrocarbonaceous feed to n-paraffin products lower in molecular weight than the $C_{10+}$ n-paraffins in the feed by contacting the feed with hydrogen and an n-paraffin selective hydroconversion catalyst containing borosilicate ZSM-48 having a mole ratio of between 40 and 400 of silicon oxide to boron oxide and having, after calcination, the powder XRD lines of Table 4. As a non-limiting example, the feed may be contacted with the catalyst under the following conditions: a temperature from about 320° C. to 420° C., a pressure between 50 and 5000 psig, and a liquid hourly space velocity (LHSV) between 0.5 and 5. The hydrocarbonaceous feed will typically contain more than about 5 wt % $C_{10+}$ normal paraffins, usually more than about 50 wt % $C_{10+}$ normal paraffins, and often more than about 80 wt % $C_{10+}$ normal paraffins.

DETAILED DESCRIPTION OF THE INVENTION

Figure 1:
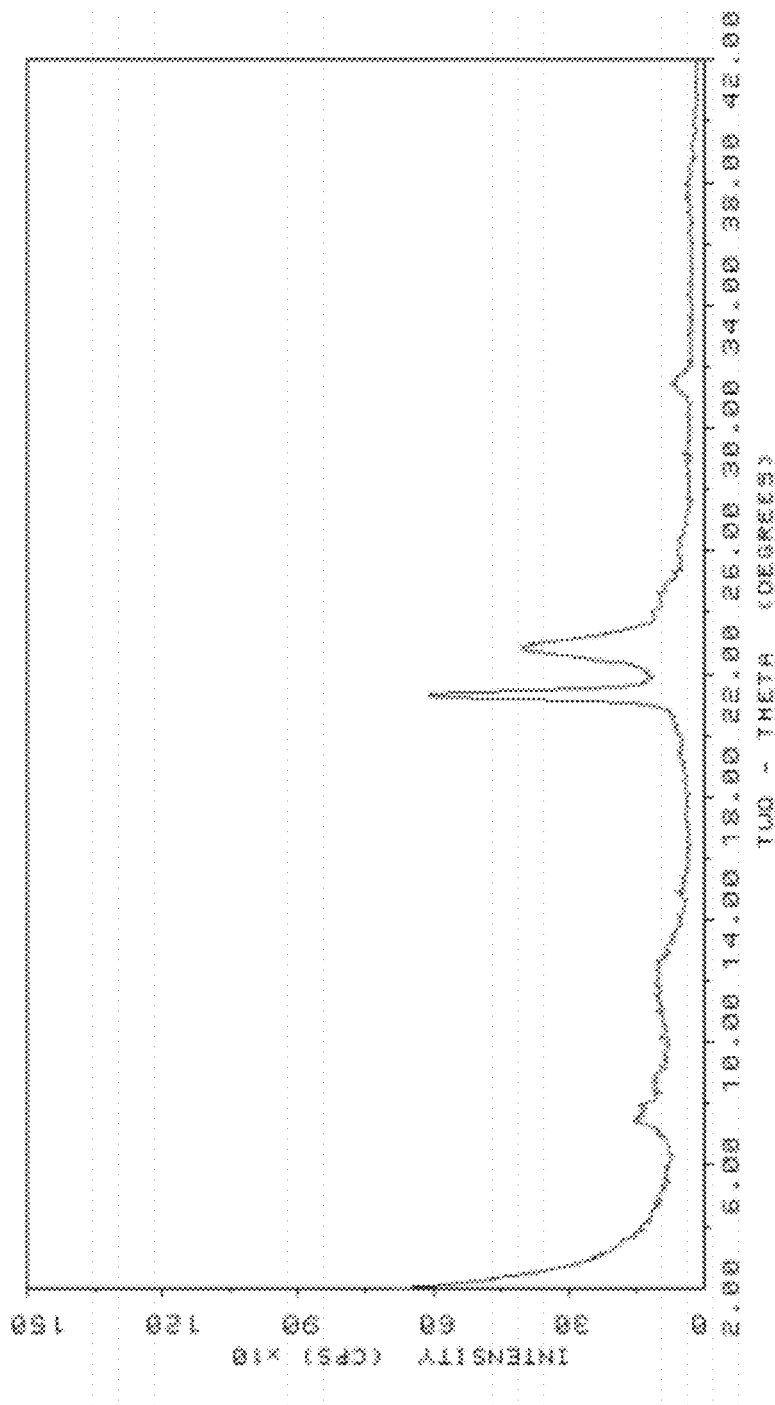
FIG. 1 shows a powder x-ray diffraction pattern of a borosilicate ZSM-48 prepared according to Example 1 of the present invention.

The present invention is directed to borosilicate ZSM-48, methods for preparing borosilicate ZSM-48, and uses for borosilicate ZSM-48. The borosilicate ZSM-48 molecular sieves of the present invention may be prepared in a small crystalline form, and are useful for the selective hydroconversion of heavier n-paraffins into lighter n-paraffin products, with minimal formation of i-paraffins.

INTRODUCTION

The term "active source" means a reagent or precursor material capable of supplying at least one element in a form that can react and which may be incorporated into the molecular sieve structure. The terms "source" and "active source" may be used interchangeably herein.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "ZSM-48 family of molecular sieves" and "ZSM-48" are synonymous and refer to a series of disordered molecular sieves which contain layers built from tubular pores of rolled-up honeycomb-like sheets of fused T6-rings with T10-ring windows, as described by Lobo and coworkers in "The Structural Disorder in the ZSM-48 Family of Zeolite Materials" *Acta Crystallographica*, A58 (Supplement), C41 (2002).

The term "hydroconversion" refers to a catalytic process which operates at pressures greater than atmospheric pressure in the presence of hydrogen and which converts $C_{10+}$ normal paraffins into lower molecular weight n-paraffins with a minimum of isomerization and without excessive formation of methane.

The term "hydrocarbon converting conditions" may be used herein to refer to one or more sets of physical and/or chemical parameters, such as a suitable temperature, pressure, and catalyst composition that allow the catalytic conversion of a hydrocarbon in a hydrocarbonaceous feed to other chemical entities.

Iso-paraffin to normal paraffin ratios (i/n ratios) refer to weight ratios unless otherwise noted.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

Synthesis of Borosilicate ZSM-48

Reaction Mixture

In general, the borosilicate ZSM-48 (B-ZSM-48) of the present invention may be prepared by:

(a) forming a reaction mixture containing: (1) at least one source of silicon oxide; (2) at least one source of boron oxide; (3) at least one source of an element selected from Groups 1 and 2 of the Periodic Table; (4) hydroxide ions; (5) a structure directing agent selected from dications represented by the following structure (1):

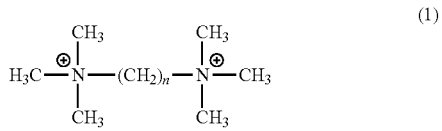

wherein n is an integer of from 8 to 12; and (6) water; and (b) maintaining the reaction mixture under conditions sufficient to form crystals of the molecular sieve. In one subembodiment, the structure directing agent is selected from dications represented by structure (1), wherein n is 8, 9, 11, or 12.

The composition of the reaction mixture from which the borosilicate ZSM-48 molecular sieve is formed, in terms of molar ratios, is identified in Table 1 below:

TABLE 1

| Reactants | Broad | Preferred |
| --- | --- | --- |
| $SiO_2/B_2O_3$ | 8-400 | 15-80 |
| $Q/SiO_2$ | 0.05-0.5 | 0.1-0.3 |
| $M/SiO_2$ | 0.05-1.0 | 0.1-0.3 |
| $OH^-/SiO_2$ | 0.1-0.8 | 0.15-0.4 |
| $H_2O/SiO_2$ | 15-100 | 20-60 | wherein M is selected from the elements of Groups 1 and 2 of the Periodic Table, and Q is a structure directing agent selected from dications represented by structure (1), wherein n is an integer of from 8 to 12.

Sources of silicon oxide useful herein may include fumed silica, precipitated silicates, silica hydrogel, silicic acid, colloidal silica, tetra-alkyl orthosilicates (e.g. tetraethyl orthosilicate), and silica hydroxides. Sources of boron oxide which may be useful in the present invention include borosilicate glasses, alkali borates, boric acid, borate esters, and certain molecular sieves. Non-limiting examples of a source of boron oxide include potassium tetraborate decahydrate and boron beta molecular sieve (B-beta molecular sieve).

For each embodiment described herein, the molecular sieve reaction mixture can be supplied by more than one source. Also, two or more reaction components can be provided by one source. As an example, borosilicate molecular sieves may be synthesized from boron-containing beta molecular sieves, as taught in U.S. Pat. No. 5,972,204, issued Oct. 26, 1999 to Corma et al.

The reaction mixture can be prepared either batch-wise or continuously. Crystal size, crystal morphology, and crystallization time of the borosilicate ZSM-48 of the present invention may vary with the nature of the reaction mixture and the crystallization conditions.

As described hereinabove, the reaction mixture may include at least one source of an element (which may be referred to herein as "M") selected from Group 1 or 2 of the Periodic Table. A source of element M may comprise any M-containing compound which is not detrimental to the crystallization process. M-containing compounds may include oxides, hydroxides, nitrates, sulfates, halides, oxalates, citrates and acetates thereof. In one subembodiment, the element from Group 1 or 2 of the Periodic Table may be sodium (Na) or potassium (K). In a subembodiment, an M-containing compound may comprise an alkali metal halide, such as a bromide or iodide of potassium.

Relatively small amounts of aluminum (Al) may also be present in certain reaction mixtures as a trace contaminant of one or more components of the reaction mixture. Preferably, the presence of Al in the reaction mixture is minimized or avoided.

The SDA dication of the reaction mixture is typically associated with anions which may be any anion that is not detrimental to the formation of the molecular sieve. Representative anions include chloride, bromide, iodide, hydroxide, acetate, sulfate, tetrafluoroborate, carboxylate, and the like.

Crystallization of B-ZSM-48

In practice, the borosilicate ZSM-48 molecular sieve of the present invention may be prepared by (a) preparing a reaction mixture as described hereinabove; and (b) maintaining the reaction mixture under crystallization conditions sufficient to form crystals of the molecular sieve.

The reaction mixture is maintained at an elevated temperature until the crystals of the molecular sieve are formed. The hydrothermal crystallization is usually conducted under pressure, and usually in an autoclave so that the reaction mixture is subject to autogenous pressure, at a temperature between about 140° C. and 180° C.

The reaction mixture may be subjected to mild stirring or agitation during the crystallization step. It will be understood by a person skilled in the art that the borosilicate ZSM-48 described herein may contain trace impurities, such as amorphous materials, phases having framework topologies which do not coincide with the molecular sieve, and/or other impurities (e.g., organic hydrocarbons).

During the hydrothermal crystallization step, crystals of borosilicate ZSM-48 can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are typically added in an amount between about 0.5% and 5% of the weight of the source of silicon dioxide used in the reaction mixture.

Once the molecular sieve crystals have formed, the solid product may be separated from the reaction mixture by mechanical separation techniques such as filtration. The crystals are water washed and then dried to obtain as-synthesized molecular sieve crystals. The drying step can be performed at atmospheric pressure or under vacuum.

Post-Synthesis Treatment of B-ZSM-48

The borosilicate ZSM-48 of the invention may be used as-synthesized, but typically the molecular sieve will be thermally treated (calcined). The term "as-synthesized" refers to the borosilicate ZSM-48 in its form after crystallization, prior to removal of the SDA cation and/or element M. The SDA can be removed by thermal treatment (e.g., calcination), preferably in an oxidative atmosphere (e.g., air, or another gas with an oxygen partial pressure greater than 0 kPa), at a temperature (readily determinable by one skilled in the art) sufficient to remove the SDA from the molecular sieve. The SDA can also be removed by photolysis techniques, e.g., by exposing the SDA-containing molecular sieve product to light or electromagnetic radiation that has a wavelength shorter than visible light under conditions sufficient to selectively remove organic material from the molecular sieve, substantially as described in U.S. Pat. No. 6,960,327 to Navrotsky and Parikh, issued Nov. 1, 2005.

Usually, it may also be desirable to remove alkali metal cations from the borosilicate ZSM-48 by ion exchange and to replace the alkali metal cations with hydrogen, ammonium, or a desired metal ion. The borosilicate ZSM-48 can also be impregnated with various metals, such as a metal selected from Groups 8-10 of the Periodic Table, including Pt, Pd, Ni, Rh, Ir, Ru, Os, or combinations thereof.

Following ion exchange, the molecular sieve is typically washed with water and dried at temperatures ranging from about 90° C. to 120° C. After washing, the molecular sieve can be calcined in air, steam, or inert gas at a temperature ranging from about 315° C. to 650° C. for periods ranging from about 1 to 24 hours, or more, to produce a catalytically active product particularly useful in hydrocarbon conversion processes.

Characterization of the Product

Borosilicate ZSM-48 prepared according to the present invention has a composition, as-synthesized and in the anhydrous state, as shown in Table 2, in terms of mole ratios, wherein Q and M are as described hereinabove:

TABLE 2

| | |
|---|---|
| $SiO_2/B_2O_3$ | 40-200 |
| $Q/SiO_2$ | 0.01-0.05 |
| $M/SiO_2$ | 0-0.04 |

The borosilicate ZSM-48 of the present invention typically crystallizes as spherical or ovoid aggregates of intergrown crystals, wherein the aggregates have a diameter less than 2 μm, and often less than 1 μm. In some embodiments, the individual crystals within the aggregates may be at least substantially needle-shaped with a length in the range of about 20 to 200 nm, and a thickness in the range of about 5 nm to 50 nm, and mostly having a thickness in the range of about 5 nm to 20 nm.

Borosilicate ZSM-48-type molecular sieves synthesized by the methods described herein are characterized by their powder XRD pattern. The powder XRD lines of Table 3 are representative of as-synthesized borosilicate ZSM-48-type molecular sieves made in accordance with the present invention.

TABLE 3

Characteristic powder XRD lines for as-synthesized B-ZSM-48

| 2 Theta[a] | d-spacing (Angstroms) | Relative Absolute Intensity[b] |
|---|---|---|
| 7.69 | 11.48 | W |
| 8.58 | 10.29 | W |
| 21.41 | 4.15 | VS |
| 22.95 | 3.87 | VS |

TABLE 3-continued

Characteristic powder XRD lines for as-synthesized B-ZSM-48

| 2 Theta[a] | d-spacing (Angstroms) | Relative Absolute Intensity[b] |
|---|---|---|
| 24.61 | 3.61 | W |
| 31.55 | 2.83 | W |

[a]±0.30
[b]The powder XRD patterns provided are based on a relative intensity scale in which the strongest line in the X-ray pattern is assigned a value of 100: W (weak) is less than 20; M (medium) is between 20 and 40; S (strong) is between 40 and 80; VS (very strong) is greater than 80.

The powder XRD patterns and data presented herein were collected by standard techniques. The radiation was CuK-αradiation. The peak heights and the positions, as a function of 2θ where θ is the Bragg angle, were read from the absolute intensities of the peaks, and d, the interplanar spacing in Angstroms corresponding to the recorded lines, can be calculated.

The powder XRD data of Table 4 are representative of calcined borosilicate ZSM-48 molecular sieves made in accordance with the present invention.

TABLE 4

Characteristic powder XRD lines for calcined B-ZSM-48

| 2 Theta[a] | d-spacing (Angstroms) | Relative Absolute Intensity(%)[b] |
|---|---|---|
| 7.6 | 11.56 | W |
| 8.5 | 10.38 | W |
| 15.2 | 5.83 | W |
| 21.5 | 4.14 | S |
| 23.1 | 3.84 | S |
| 24.5 | 3.63 | W |
| 25.0 | 3.56 | W |
| 31.7 | 2.82 | W |

[a]±0.30
[b]The powder XRD patterns provided are based on a relative intensity scale in which the strongest line in the X-ray pattern is assigned a value of 100: W (weak) is less than 20; M (medium) is between 20 and 40; S (strong) is between 40 and 80; VS (very strong) is greater than 80.

Figure 7:
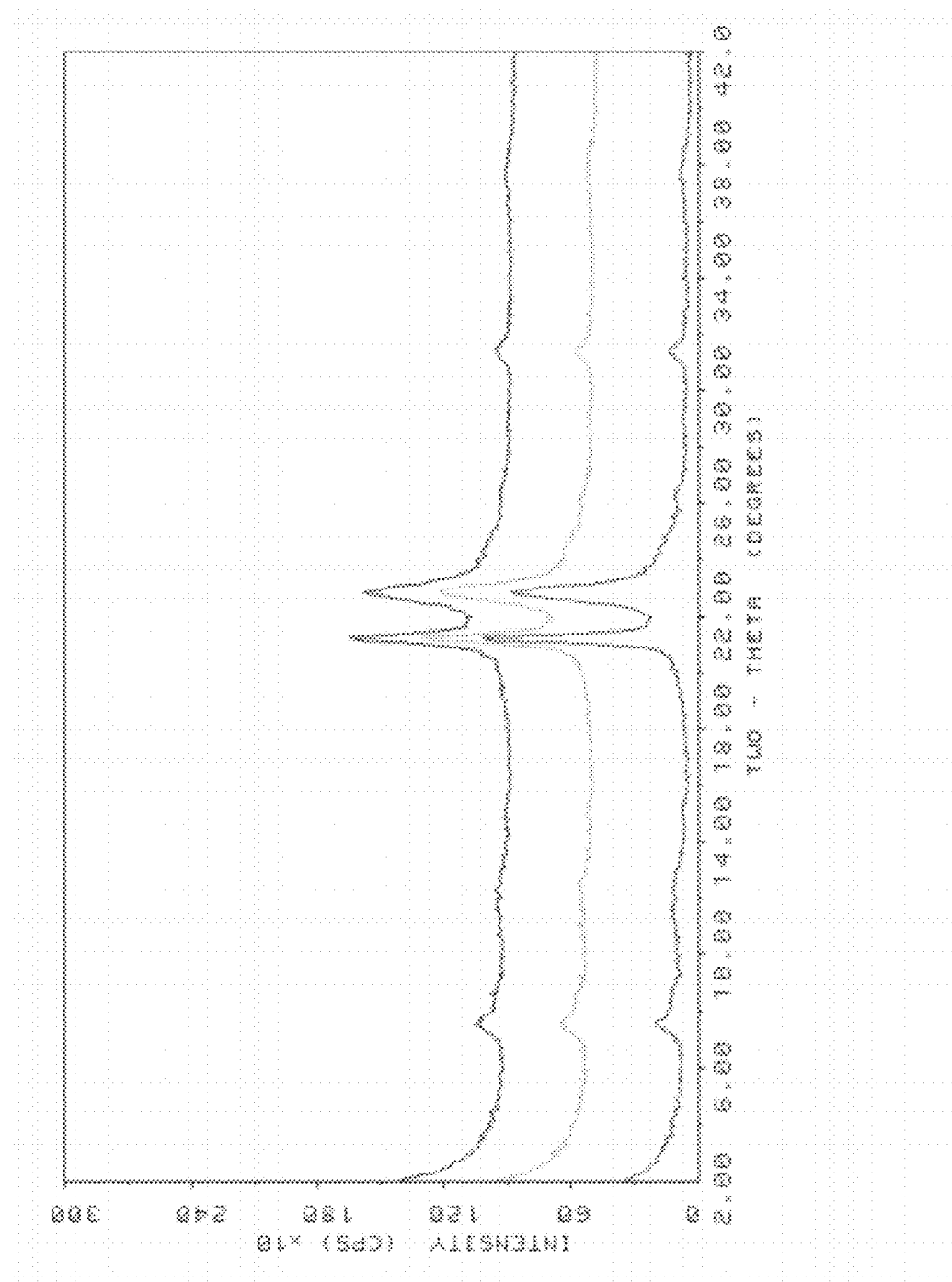
FIG. 7 shows powder x-ray diffraction patterns of borosilicate ZSM-48 prepared with three different levels of boron, according to Examples 5 and 6 of the present invention.

Minor variations in the diffraction pattern can result from variations in the mole ratios of the framework species of the particular B-ZSM-48 sample due to changes in lattice constants. In addition, sufficiently small crystals will affect the shape and intensity of peaks, leading to significant peak broadening (see, for example, FIG. 7). Minor variations in the diffraction pattern can also result from variations in the structure of the organic template used in the molecular sieves preparation. Calcination can also cause minor shifts in the powder XRD pattern. Notwithstanding these minor perturbations, the basic crystal lattice structure remains unchanged.

Applications for Borosilicate ZSM-48

Borosilicate ZSM-48 prepared according to the present invention may find a variety of applications, for example, as a catalyst in various reactions, such as hydrocarbon conversion reactions. In one embodiment, the borosilicate ZSM-48 of the present invention is be used for selectively hydroconverting heavy n-paraffins into lighter n-paraffin products.

Catalyst Compositions Containing B-ZSM-48

Catalyst compositions containing borosilicate ZSM-48 of the present invention may have a composition, in terms of weight percent, as shown in Table 5:

TABLE 5

| Component | Broad | Preferred |
|---|---|---|
| borosilicate ZSM-48 | 1-99% | 15-50% |
| binder | 1-99% | 50-85% |
| Group 8-10 metals(s) and other elements | 0-10% | 0.05-5% |

For commercial applications as a catalyst, the borosilicate ZSM-48 may be formed into a suitable size and shape. This forming can be done by techniques such as pelletizing, extruding, and combinations thereof. In the case of forming by extrusion, extruded materials can be cylinders, trilobes, fluted, or have other shapes, which may be axially symmetrical, and that promote diffusion and access of feed materials to interior surfaces of the B-ZSM-48 extrusion product.

In preparing catalysts for use in processes of the present invention, the B-ZSM-48 crystals can be composited with binders resistant to the temperatures and other conditions employed in hydrocarbon conversion processes. Also, it is preferred to use binders that do not impart strong acidity into the catalyst. Such binders can include active and inactive materials. Frequently, binders are added to improve the crush strength of the catalyst.

The binder material can be selected from among the refractory oxides of elements of Groups 4 and 14 of the Periodic Table. Of these, oxides of silicon, titanium and zirconium are noteworthy, with silica being particularly useful, especially low-aluminum silica. Combinations of these and other oxides may also be useful. For example, silica-magnesia, silica-zirconia, silica-thoria, silica-beryllia, silica-titania, titania-zirconia, and silica-magnesia-zirconia can be used, provided that these combinations do not form materials with strong acidity. These refractory oxides can be crystalline or amorphous, or can be in the form of gelatinous precipitates, colloids, sols, or gels. Silica in the form of a silica sol is a preferred binder. A preferred silica sol has about 30 wt % silica and a particle size of about 7-9 nm in diameter, which provides catalysts having good attrition resistance and excellent crush strengths.

Forming pellets or extrudates from molecular sieves generally involves using extrusion aids and viscosity modifiers in addition to binders. These additives are typically organic compounds such as cellulose based materials, for example, METHOCEL cellulose ether (Dow Chemical Co.), ethylene glycol, and stearic acid. Many such compounds are known in the art. It is important that these additives do not leave a detrimental residue, i.e., one with undesirable reactivity or one that can block pores of the molecular sieve, after pelletizing. For this invention, it is especially desirable that such residues do not create strong acid functions in the catalyst. The above-described washing will remove low levels of these materials. The residue from the extrusion aid is preferably less than a few tenths of a percent, more preferably less than 0.1 wt %.

Methods for preparing catalyst compositions are well known to those skilled in the art and include such conventional techniques as spray drying, pelletizing, extrusion, various sphere-making techniques, and the like.

The relative proportions of the B-ZSM-48 and binder in the catalyst composition can vary widely. Generally, the B-ZSM-48 content of the catalyst composition ranges from between about 1 to about 99 weight percent (wt %) of the dry composite, usually in the range of from about 5 to about 95 wt % of the dry composite, and more typically from about 50 to 85 wt % of the dry composite (see, for example, Table 5 hereinabove).

The catalyst can optionally contain one or more metals selected from Groups 8-10 of the Periodic Table. In one subembodiment, the catalyst contains a metal selected from the group consisting of Pt, Pd, Ni, Rh, Ir, Ru, Os, and mixtures thereof. In another subembodiment, the catalyst contains platinum (Pt). For each embodiment described herein, the Group 8-10 metal content of the catalyst may be generally in the range of from 0 to about 10 wt %, typically from about 0.05 to about 5 wt %, usually from about 0.1 to about 3 wt %, and often from about 0.3 to about 1.5 wt %. Platinum compounds that form positively charged platinum complex ions in solution are a preferred source of platinum to be combined with the molecular sieve. Both platinum tetraamine chloride and platinum tetraamine nitrate are suitable for use in preparing catalysts used in the process of the present invention. The preparation of a platinum-impregnated molecular sieve for catalytic hydrocarbon conversion is disclosed in commonly assigned U.S. Patent Application Pub. No. 2007/0032692, the disclosure of which is incorporated by reference herein in its entirety.

Additionally, other elements may be used in combination with the metal selected from Groups 8-10 of the Periodic Table. Examples of such other elements include Sn, Re, and W. Examples of combinations of elements that may be used in catalyst materials of the present invention include, without limitation, Pt/Sn, Pt/Pd, Pt/Ni, and Pt/Re. These metals or other elements can be readily introduced into the B-ZSM-48 composite using one or more of various conventional techniques, such as ion-exchange, pore-fill impregnation, or incipient wetness impregnation. The incipient wetness impregnation method may be preferred for certain applications under the present invention. However regardless of the impregnation technique, the metal, e.g., platinum, is incorporated into the B-ZSM-48 in a manner that results in uniform dispersion of the metal amongst the molecular sieve. In this regard, a chelating agent such as citric acid may be used to promote dispersion of the metal. Reference to the catalytically active metal or metals is intended to encompass such metal or metals in the elemental state or in some form such as an oxide, sulfide, halide, carboxylate, and the like.

Hydroconversion of Heavier n-Paraffins to n-Paraffin-Rich Lighter Products

Borosilicate ZSM-48, prepared according to the novel methods described herein, is useful for selectively hydroconverting heavy normal paraffins into lighter normal paraffin products with minimal formation of isoparaffins.

Catalytic hydrocarbon conversion processes of the present invention may be referred to herein as n-paraffin selective hydroconversion. In contrast, "cracking" is a broad term that refers to all processes and reactions, including thermal cracking, catalytic cracking, hydrocracking, and hydrogenolysis, that decrease the molecular weight of hydrocarbons by breaking them into smaller components. Of these processes, thermal cracking and catalytic cracking do not use added hydrogen, whereas hydrocracking and hydrogenolysis do use hydrogen.

N-paraffin selective hydroconversion processes described herein, which also use hydrogen, may be distinguished from hydrocracking and hydrogenolysis by the formation of paraffinic products having lower (typically much lower) iso/normal alkane (i/n) ratios; and n-paraffin selective hydroconversion is further distinguished from hydrogenolysis by lower methane yields (for example, less than 1 wt %) when compared at high conversions. N-paraffin selective hydroconversion is distinguished from typical thermal and catalytic cracking, in terms of product formed, by the absence of significant amounts (i.e., 1 wt % or more) of olefins.

According to the present invention, a process for converting hydrocarbons includes contacting a hydrocarbonaceous feed, under hydrocarbon converting conditions, with a borosilicate ZSM-48 molecular sieve having a mole ratio of between 40 and 400 of silicon oxide to boron oxide and having, after calcination, the powder XRD lines of Table 4. The hydrocarbonaceous feed will typically contain more than about 5 wt % $C_{10+}$ normal paraffins, usually more than about 50 wt % $C_{10+}$ normal paraffins, and often more than about 80 wt % $C_{10+}$ normal paraffins.

According to one aspect of the invention, a process for hydroconverting hydrocarbons includes contacting a hydrocarbonaceous feed, under hydrocarbon converting conditions, with a borosilicate ZSM-48 molecular sieve having a mole ratio of between 40 and 400 of silicon oxide to boron oxide and having, after calcination, the powder XRD lines of Table 4, wherein the borosilicate molecular sieve is prepared by contacting under crystallization conditions (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by structure (1), wherein n is an integer of from 8 to 12. In a subembodiment, the structure directing agent is selected from dications represented by structure (1), wherein n is 8, 9, 11, or 12.

Catalyst compositions containing borosilicate ZSM-48 can optionally contain one or more metals selected from Groups 8-10 of the Periodic Table, e.g., a metal selected from the group consisting of Pt, Pd, Ni, Rh, Ir, Ru, Os, and mixtures thereof, generally as described hereinabove. The amount of the Group 8-10 metal is generally from about 0.05 to 5 wt % based on the weight of the borosilicate ZSM-48 molecular sieve. The Group 8-10 metal may be dispersed within the molecular sieve, e.g., within the pores of the sieve. The catalyst may be prepared by impregnating the borosilicate ZSM-48 with the Group 8-10 metal, and thereafter calcining the molecular sieve.

In one subembodiment, $C_{10+}$ n-paraffins in a hydrocarbonaceous feed are converted to n-paraffin products lower in molecular weight than the $C_{10+}$ n-paraffins in the feed, by contacting the feed with hydrogen and a borosilicate ZSM-48 molecular sieve having a mole ratio of between 40 and 400 of silicon oxide to boron oxide and having, after calcination, the powder XRD lines of Table 4. As a non-limiting example, the feed may be contacted with the catalyst under conditions comprising: a) a temperature between about 320° C. and 420° C., b) a pressure between 50 and 5000 psig, and c) an LHSV between 0.5 and 5. Processes of the invention provide a hydrocarbon conversion product comprising a mixture of alkanes, which may include $C_1$-$C_{13}$ n-alkanes, wherein the product comprises less than (<) 1 wt % methane, typically <0.5 wt %, and often <0.1 wt %.

The borosilicate ZSM-48 of the present invention may be used for converting $C_{14+}$ n-paraffins in a hydrocarbonaceous feed to n-paraffins of lower molecular weight with minimal formation of isoparaffins. As a non-limiting example, in the temperature range between about 375° C. and 400° C. a catalyst prepared according to the invention converts at least about 92% of the $C_{14+}$ n-paraffins in the feed to provide a product having a combined $C_4$-$C_{13}$ iso/normal alkane (i/n) weight ratio equal to or less than ($\leqq$) 0.15, and in a subembodiment equal to or less than ($\leqq$) 0.10, By "combined $C_4$-$C_{13}$ iso/normal weight ratio" is meant the weight ratio of isoparaffins to normal paraffins for the group of alkanes in the product spanning the range of $C_4$ to $C_{13}$, inclusive.

In one embodiment, the borosilicate ZSM-48 that is useful in the hydroconversion process may be synthesized as polycrystalline aggregates, wherein each aggregate comprises a plurality of individual crystals (crystallites). Each individual crystal of the aggregates may be at least substantially needle-shaped, and each needle-shaped crystal may have a length in the range of about 20 to 200 nm, and a thickness in the range of about 5 nm to about 50 nm (see, for example, FIGS. 2 and 4B).

In an aspect of the invention, n-hexadecane may be used as a model compound, to represent a "heavier" n-alkane "feed," for the identification of catalysts that provide selective hydroconversion of heavier (e.g., $C_{16}$) normal paraffins) to lighter (e.g., $C_{\leq15}$) normal paraffinic products, as compared with isomerized products. As an example, n-hexadecane may be used to identify n-paraffin selective hydroconversion catalysts that convert n-$C_{16}$ to a product comprising alkanes of a lower molecular weight and having a low or very low (e.g., $\leq 0.5$, $\leq 0.1$, or $\leq 0.05$) iso/normal alkane (i/n) ratio (see, e.g., Example 8 and Table 6).

In one embodiment, an n-paraffin-selective hydroconversion catalyst of the present invention, which comprises borosilicate ZSM-48, converts at least about 67% of n-$C_{16}$ alkane (n-hexadecane) under conditions as defined in Example 8 and at a temperature from about 370° C. to 400° C. to provide a product which comprises a $C_6$ alkane product having an i/n ratio of $\leq 0.09$ ($0 \leq i/n \leq 0.09$).

In one subembodiment, an n-paraffin selective hydroconversion catalyst of the present invention converts at least about 90% of n-hexadecane under conditions as defined in Example 8, and at a temperature from about 375° C. to 400° C., to provide a $C_6$ alkane product with an i/n ratio of 0 to 0.09. At a temperature between about 390° C. and 400° C. conversion of the n-hexadecane is at least about 96% and the catalyst provides a $C_6$ alkane product with an i/n ratio of 0 to 0.09.

In another embodiment, an n-paraffin selective hydroconversion catalyst of the present invention converts at least about 90% of n-$C_{16}$ alkane under conditions as defined in Example 8 and at a temperature from about 375° C. to 395° C. to provide a $C_7$-$C_{13}$ yield of at least about 67%. In a subembodiment, an n-paraffin selective hydroconversion catalyst of the present invention converts at least about 92% of n-$C_{16}$ alkane under conditions as defined in Example 8 and at a temperature from about 375° C. to 380° C. to give a $C_6$ alkane product with an i/n ratio of 0 to 0.04, and a $C_7$-$C_{13}$ yield of at least about 80%.

The hydrocarbonaceous feed can be contacted with the catalyst in a fixed bed system, a moving bed system, a fluidized system, a batch system, or combinations thereof. Reactors similar to those employed in hydrotreating and hydrocracking are suitable. Either a fixed bed system or a moving bed system is preferred. In a fixed bed system, the preheated feed is passed into at least one reactor that contains a fixed bed of the catalyst prepared from the borosilicate ZSM-48 molecular sieve of the present invention. The flow of the feed can be upward, downward or radial. The reaction is exothermic, and interstage cooling may be needed, especially if the content of heavy paraffins is high (>50 wt %) and the conversion rate is high (>50%). Such cooling can be performed, as an example, by injection of cool hydrogen between reactor beds. The reactors can be equipped with instrumentation to monitor and control temperatures, pressures, and flow rates that are typically used in hydrocrackers. Multiple beds may also be used in conjunction with compositions and processes of the invention, wherein two or more beds may each contain a different catalytic composition, at least one of which containing borosilicate ZSM-48 of the present invention.

EXAMPLES

The following examples demonstrate but do not limit the present invention.

Example 1

Synthesis of Borosilicate ZSM-48 Using an SDA of Structure (1), n=8

4.69 g of an aqueous solution of 1,8-bis(trimethylammonium)octane hydroxide ([OH$^-$]=0.64 mmol/g), 0.37 g of potassium iodide, and 6.51 g of deionized water were mixed together. Then 0.035 g of potassium tetraborate decahydrate (KTB) was dissolved in the solution, and 0.90 g of CAB-O-SIL M-5 fumed silica (Cabot Corporation, Boston, Mass.) was added and mixed to form a uniform suspension. The suspension was placed in a Teflon cup, capped, and sealed within a 23-ml stainless steel Parr autoclave. The autoclave was placed in a spit within an oven at a temperature of 160° C. and mixed at 43 rpm for 8 days. The reactor was removed from the oven, allowed to cool, and the solids were collected by filtration and washing with deionized water. The solids were then allowed to dry in an oven at 95° C.

Figure 2:
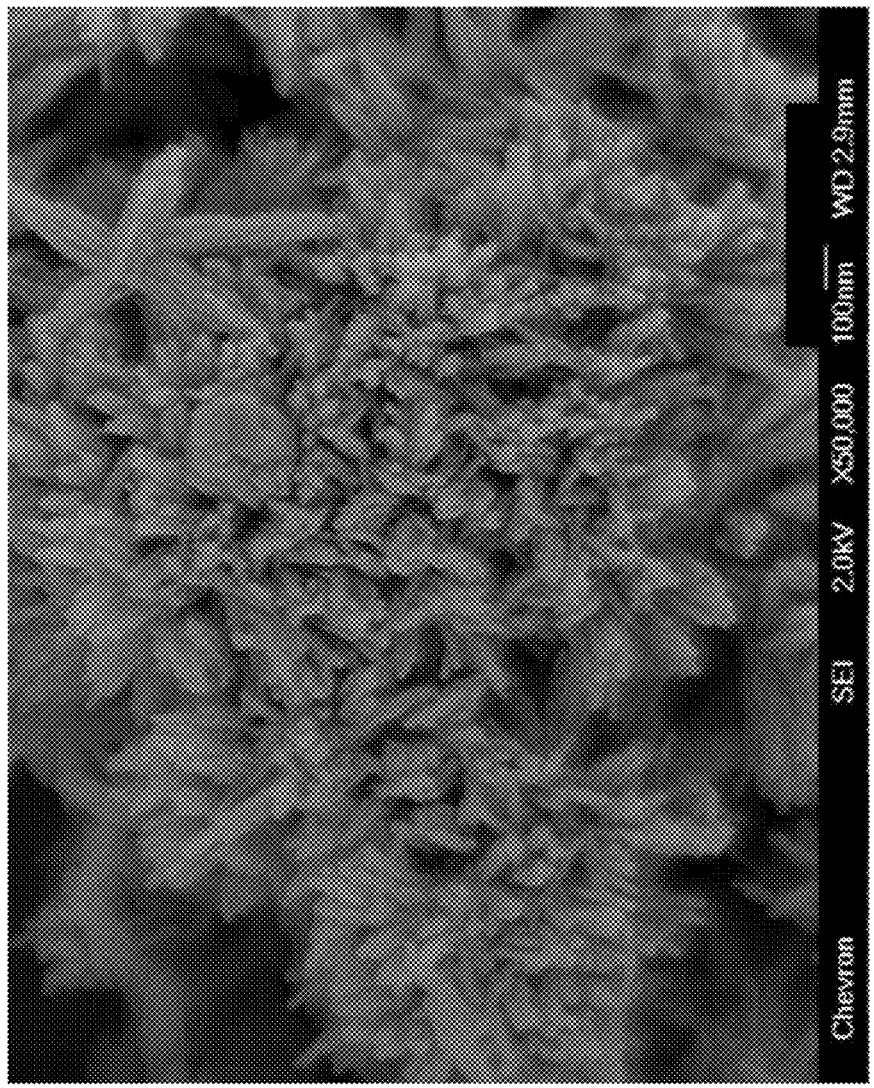
FIG. 2 is a scanning electron micrograph of the borosilicate ZSM-48 prepared according to Example 1 of the present invention.

The molecular sieve product of Example 1 was analyzed by powder XRD, inductively coupled plasma—optical emission spectroscopy (ICP-OES), and scanning electron microscopy (SEM). The resulting powder XRD pattern, as shown in FIG. 1, identified the molecular sieve product of Example 1 as borosilicate ZSM-48. The unusually broad peaks exhibited by the product of Example 1, as compared to conventional (i.e., aluminosilicate) ZSM-48, may be associated with the relatively high $B_2O_3$ content of the crystal framework, and/or with the unusually small size of the individual crystals of the borosilicate ZSM-48. The Si/B molar ratio of the borosilicate ZSM-48 product of Example 1 was determined by ICP-OES analysis to be 61. FIG. 2 is a scanning electron micrograph of the borosilicate ZSM-48 product of Example 1, and shows the polycrystalline aggregates of the borosilicate ZSM-48, where each aggregate is composed of individual needle-like crystals less than about 200 nm in length and a thickness in the range of about 5 nm to 50 nm.

Example 2

Synthesis of Borosilicate ZSM-48 Using an SDA of Structure (1), n=9

6.87 g of an aqueous solution of 1,9-bis(trimethylammonium)nonane hydroxide ([OH$^-$]=0.44 mmol/g), 0.37 g of potassium iodide, and 4.33 g of deionized water were mixed together. Then 0.035 g of KTB was dissolved in the solution, and 0.90 g of CAB-O-SIL M-5 fumed silica was added and mixed to form a uniform suspension. The suspension was placed in a Teflon cup, capped, and sealed within a 23-ml stainless steel Parr autoclave. The autoclave was placed in a spit in an oven at a temperature of 160° C. and mixed at 43 rpm for 8 days. The reactor was removed from the oven, allowed to cool, and the solids were collected by filtration and washing with deionized water. The solids were then allowed to dry in an oven at 95° C.

Figure 3:
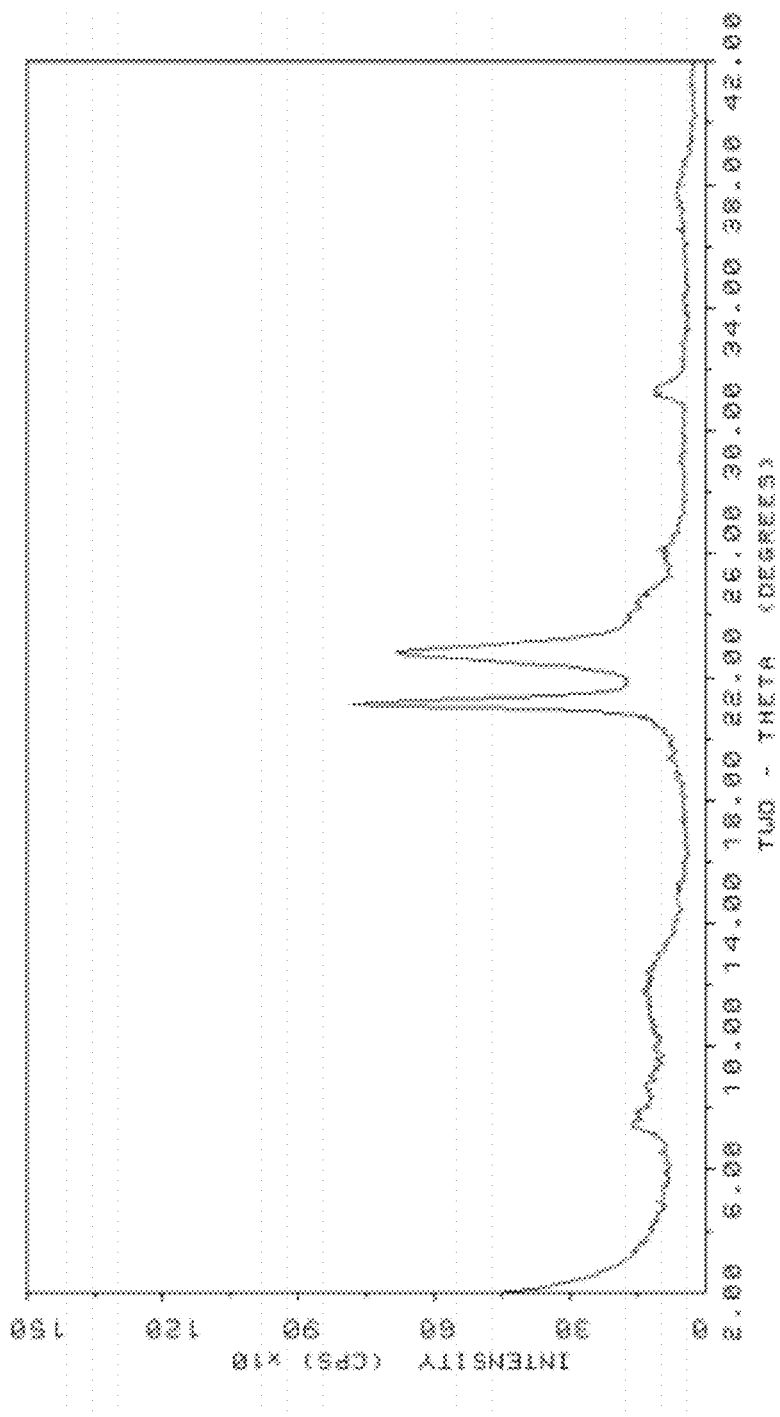
FIG. 3 shows a powder x-ray diffraction pattern of the borosilicate ZSM-48 prepared according to Example 2 of the present invention.
Figure 4A:
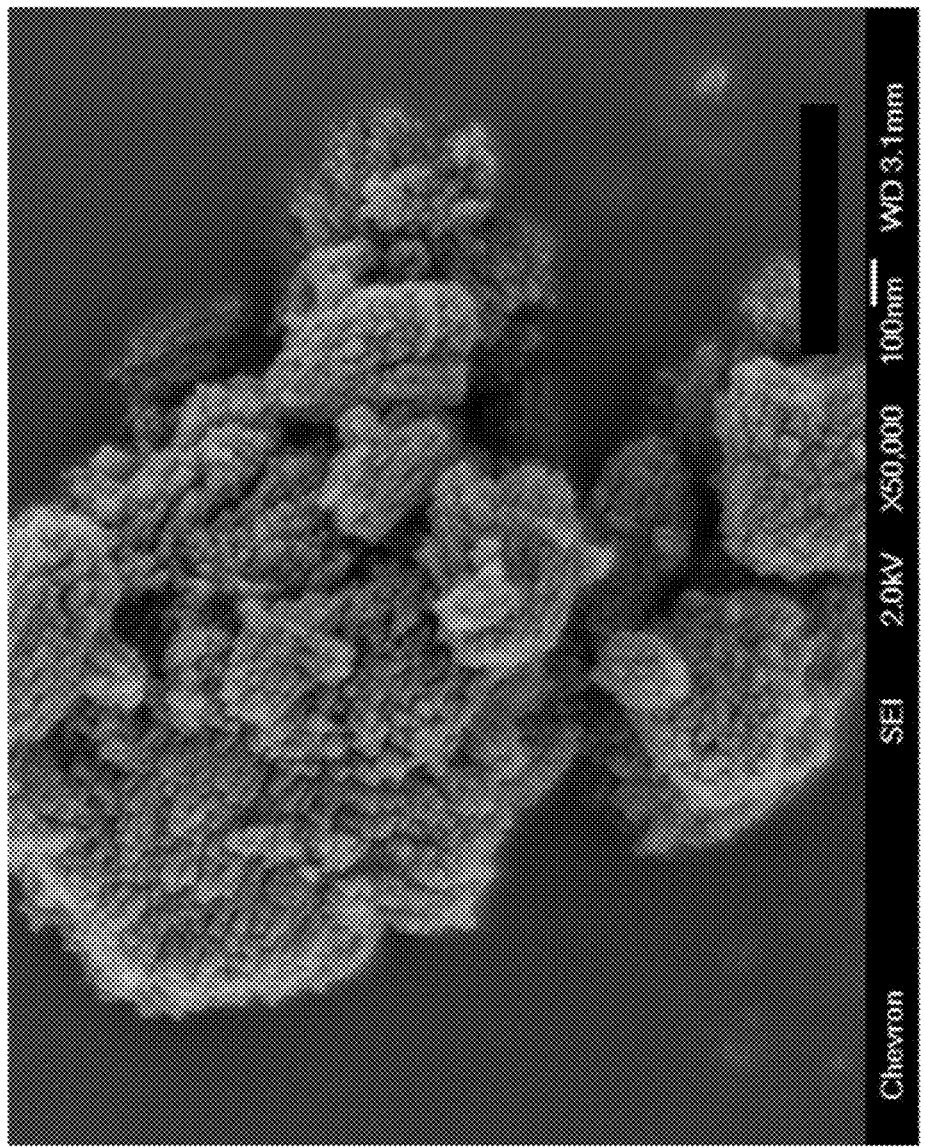
FIGS. 4A and 4B each show a scanning electron micrograph of the borosilicate ZSM-48 prepared according to Example 2 of the present invention.
Figure 4B:
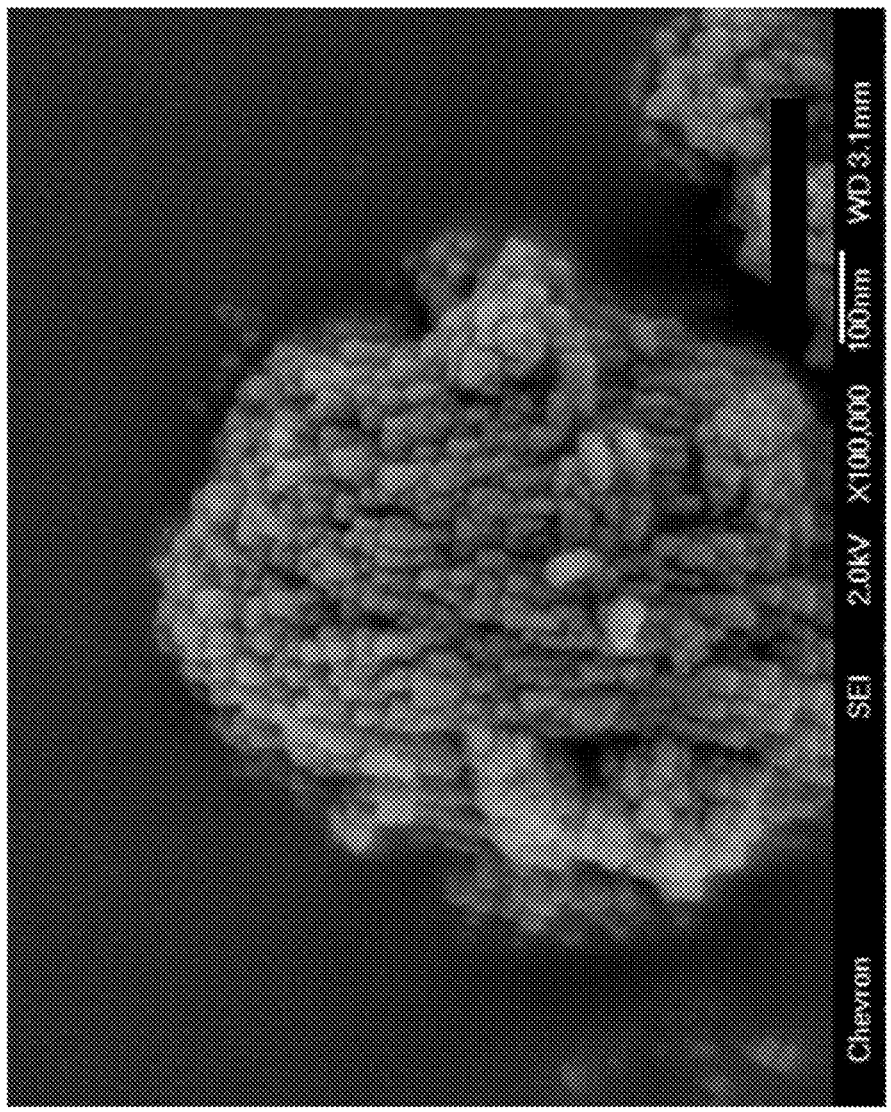

The resulting powder XRD pattern, as shown in FIG. 3, identified the molecular sieve product of Example 2 as borosilicate ZSM-48. Again, the XRD pattern exhibited unusually broad peaks as compared to conventional (aluminosilicate) ZSM-48 (see, e.g., FIG. 7). The Si/B molar ratio of the borosilicate ZSM-48 product of Example 2 was determined by ICP-OES analysis to be 80. FIGS. 4A and 4B are each SEM images of the small crystal form of borosilicate ZSM-48 prepared in Example 2. It can be seen from FIGS. 4A and 4B that the borosilicate ZSM-48 molecular sieve product of Example 2 was in the form of polycrystalline aggregates, each aggregate having a diameter in the range of about 0.5 μm to 2 μm and being composed of individual crystals having a length less than 100 nm and a thickness in the range of about 5 nm to 50 nm.

Example 3

Synthesis of Borosilicate ZSM-48 Using an SDA of Structure (1), n=10

0.63 g of 1,10-bis(trimethylammonium)decane dibromide, 3.00 g of 1N KOH, and 7.80 g of deionized water were mixed together. Then 0.035 g of KTB was dissolved in the solution, and 0.90 g of CAB-O-SIL M-5 fumed silica was added and mixed to form a uniform suspension. The suspension was placed in a Teflon cup, capped, and sealed within a 23-ml stainless steel Parr autoclave. The autoclave was placed in a spit within an oven heated at 160° C. and mixed at 43 rpm for 8 days. The reactor was removed from the oven, allowed to cool, and the solids were collected by filtration and washing with deionized water. The solids were then allowed to dry in an oven at 95° C. The molecular sieve product of Example 3, which was identified from powder XRD data as borosilicate ZSM-48, was broadly similar to that of Example 2.

The preparation of Example 3 was repeated using 0.070 g KTB instead of 0.035 g KTB, with broadly similar results. The preparation with the higher boron level (0.070 g KTB) in the mixture showed a slight broadening of the peak at about 21 degrees, consistent with the smaller needle lengths of the crystals with increasing B content.

Example 4

Synthesis of Borosilicate ZSM-48 Using an SDA of Structure (1), n=11

0.65 g of 1,11-bis(trimethylammonium)undecane dibromide, 3.00 g of 1N KOH, and 7.80 g of deionized water were mixed together. Then 0.035 g of KTB was dissolved in the solution, and 0.90 g of CAB-O-SIL M-5 fumed silica was added and mixed to form a uniform suspension. The suspension was placed in a Teflon cup, capped, and sealed within a 23-ml stainless steel Parr autoclave. The autoclave was placed in a spit within an oven heated at 160° C. and mixed at 43 rpm for 7 days. The reactor was removed from the oven, allowed to cool, and the solids were collected by filtration and washing with deionized water. The solids were then allowed to dry in an oven at 95° C.

Figure 5:
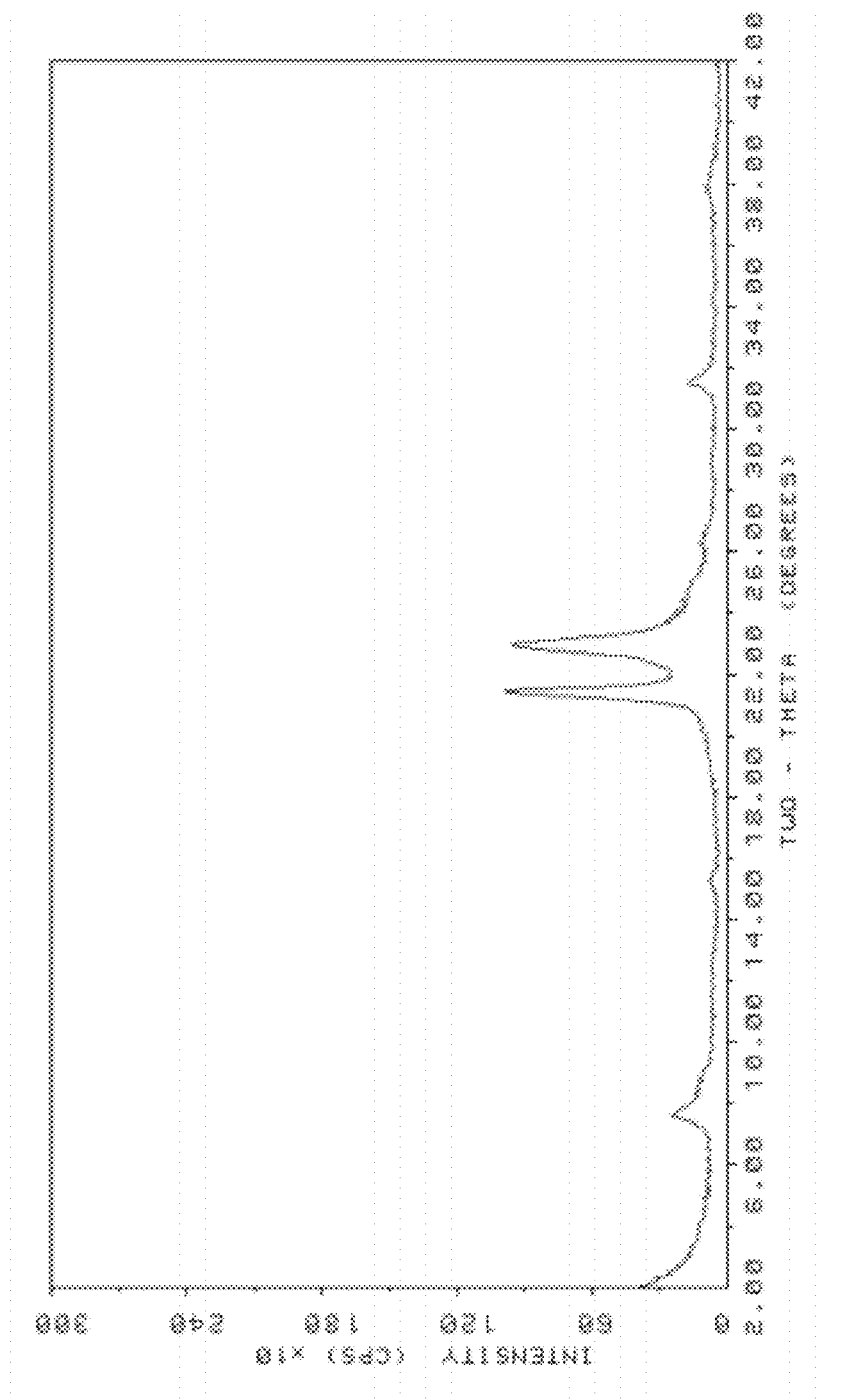
FIG. 5 shows a powder x-ray diffraction pattern of the borosilicate ZSM-48 prepared according to Example 4 of the present invention.
Figure 6A:
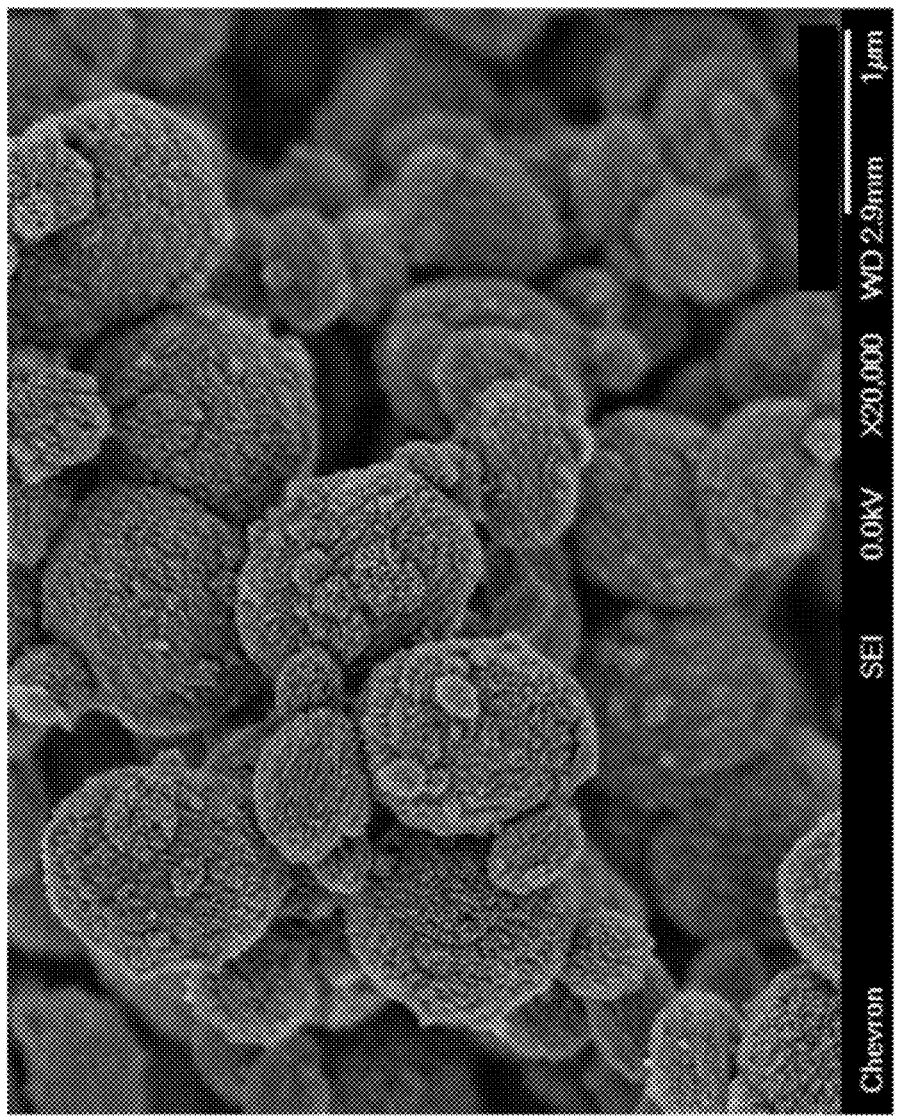
FIGS. 6A and 6B each show a scanning electron micrograph of the borosilicate ZSM-48 prepared according to Example 4 of the present invention.
Figure 6B:
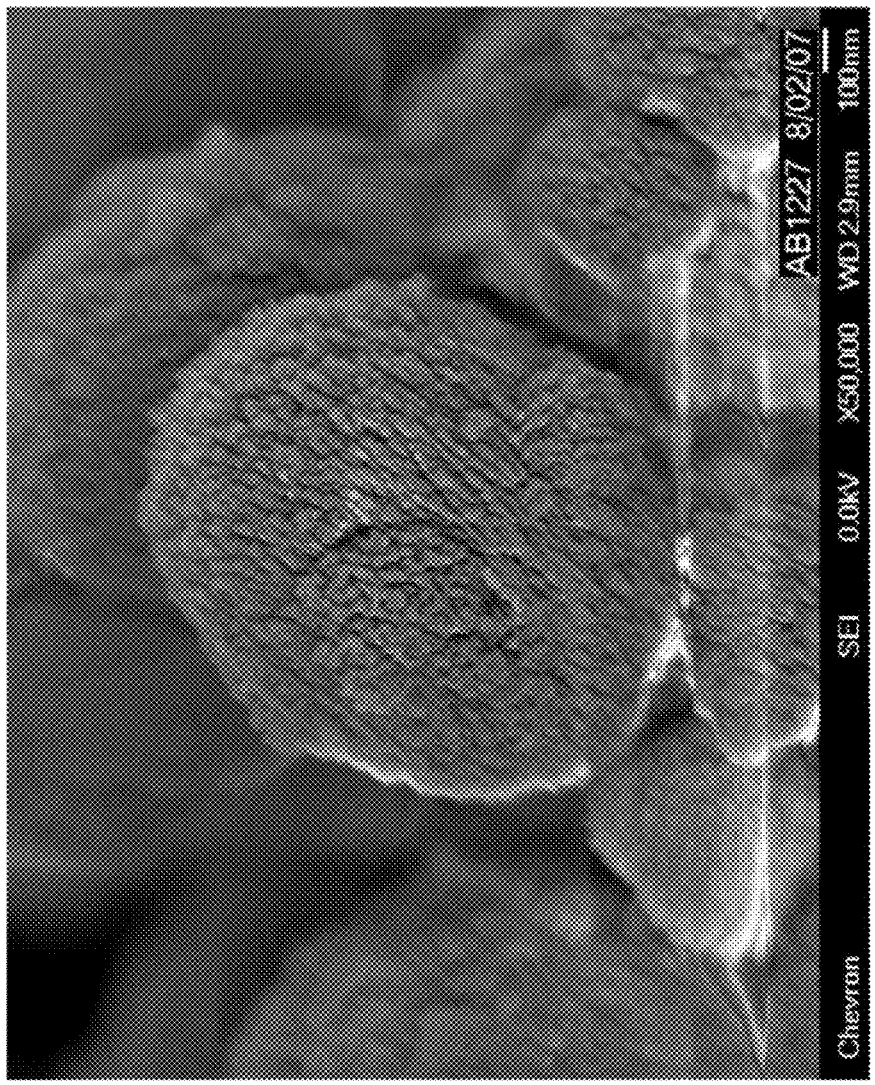

The molecular sieve product of Example 4 was analyzed by powder XRD, ICP-OES, and SEM. The resulting powder XRD pattern, as shown in FIG. 5, identified the molecular sieve product of Example 4 as borosilicate ZSM-48. Again, the XRD pattern of the product of Example 4 exhibited unusually broad peaks as compared to conventional (aluminosilicate or all silica) ZSM-48. The Si/B molar ratio of the borosilicate ZSM-48 product of Example 4 was determined by ICP-OES analysis to be 87. FIG. 6 is a SEM of the borosilicate ZSM-48 molecular sieve product of Example 4, showing the product in the form of polycrystalline aggregates composed of individual crystals each less than 100 nm in length and having a thickness in the range of about 5 nm to 50 nm.

Example 5

Synthesis of Borosilicate ZSM-48 Using an SDA of Structure (1), n=12

4.69 g of an aqueous solution of 1,12-bis(trimethylammonium)dodecane hydroxide ([OH$^-$]=0.64 mmol/g), 0.37 g of potassium iodide, and 6.49 g of deionized water were mixed together. Then 0.035 g of KTB was dissolved in the solution, and 0.90 g of CAB-O-SIL M-5 fumed silica was added and mixed to form a uniform suspension. The suspension was placed in a Teflon cup, capped, and sealed within a 23-ml stainless steel Parr autoclave. The autoclave was placed in a spit within an oven heated at 160° C. and mixed at 43 rpm for 8 days. The reactor was removed from the oven, allowed to cool, and the solids were collected by filtration and washing with deionized water. The solids were then allowed to dry in an oven at 95° C.

Example 6

The teachings of Example 5 were repeated using an intermediate amount (0.07 g) of KTB. The teachings of Example 5 were also repeated using a larger amount (1.05 g) of KTB.

The resulting molecular sieve products of Examples 5 and 6 were analyzed by powder XRD and SEM. The resulting powder XRD patterns for Examples 5 and 6, presented in FIG. 7, identified the molecular sieve product of each of Examples 5 and 6 as borosilicate ZSM-48. The three XRD traces of FIG. 7 correspond to the three preparations from Examples 5 and 6 using 0.035 g (bottom trace), 0.07 g (middle trace) and 1.05 g (top trace) of KTB. It can be seen from FIG. 7 that the XRD pattern for the products of Examples 5 and 6 showed unusually broad peaks, as compared with conventional (aluminosilicate) ZSM-48. It can also be seen from FIG. 7 that there is a trend towards broadening of the features of the XRD patterns, from the bottom trace upwards, as the boron level in the reaction mixture is increased.

Figure 8A:
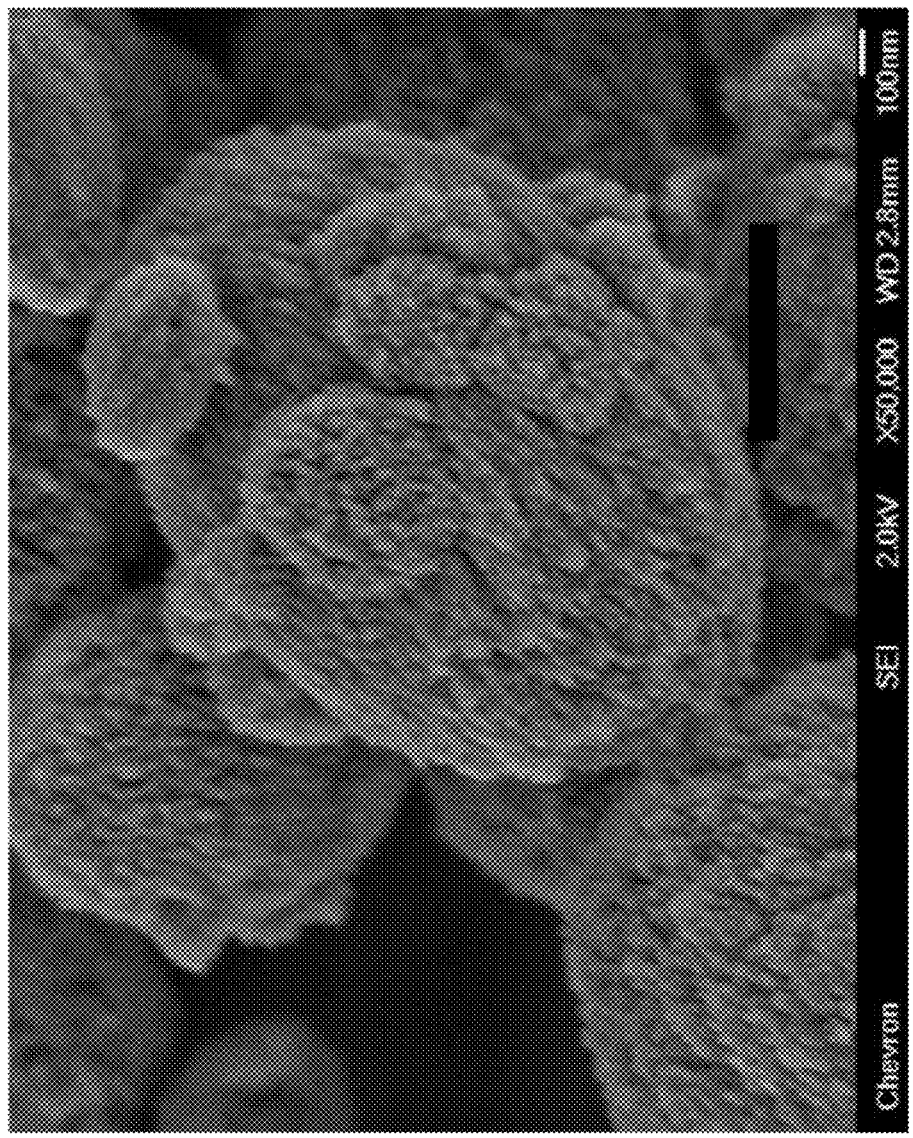
FIGS. 8A-C are scanning electron micrographs of borosilicate ZSM-48 prepared with three different levels of boron, according to Examples 5 and 6 of the present invention.
Figure 8B:
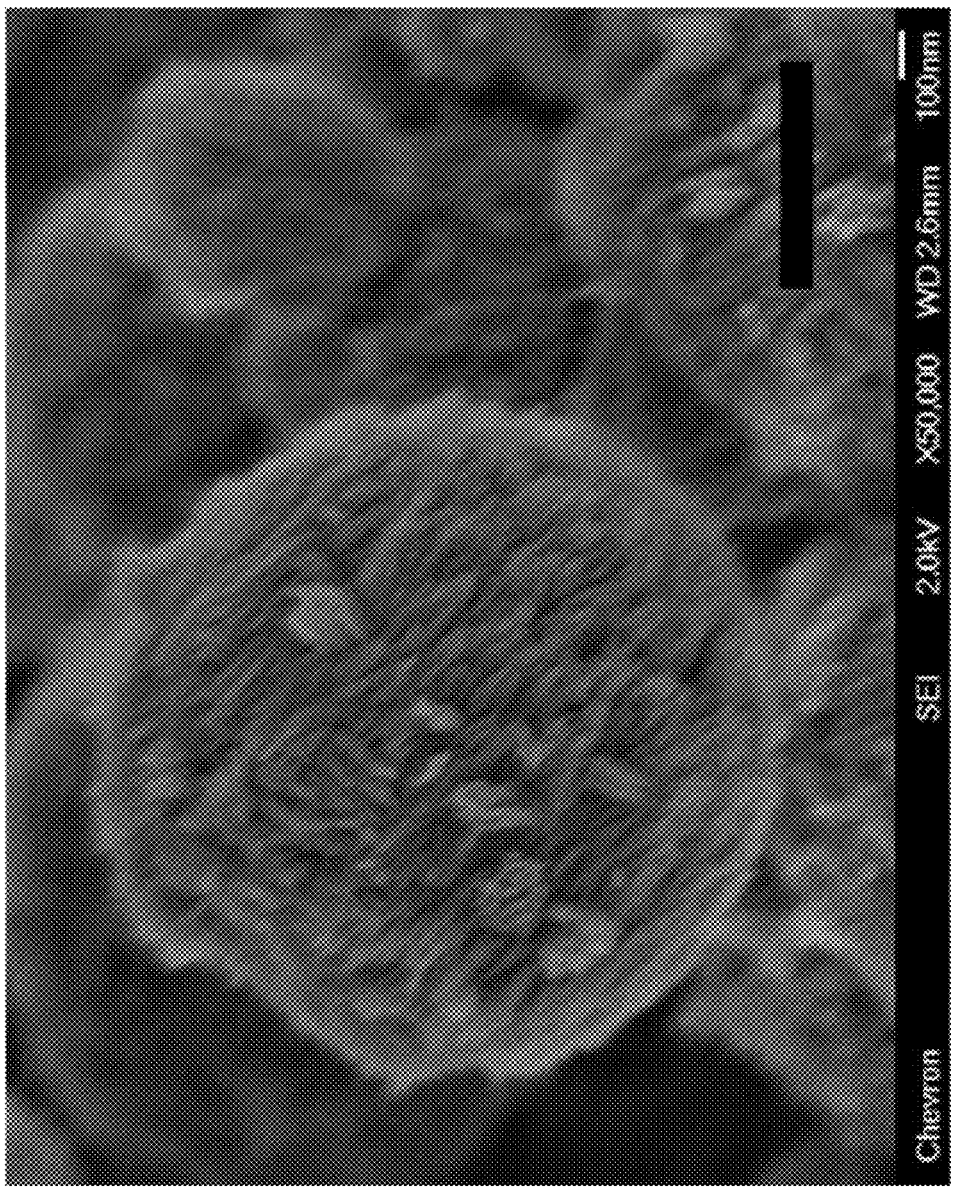
Figure 8C:
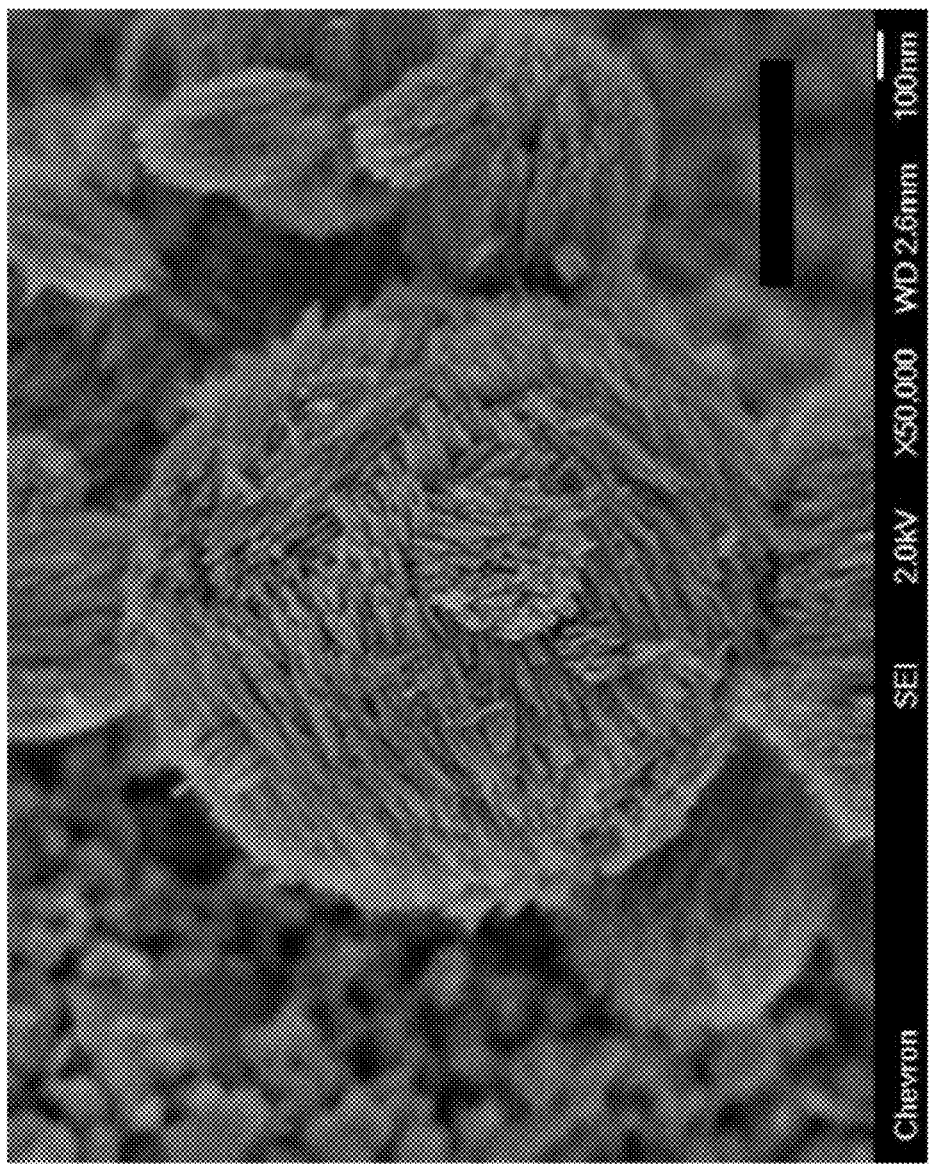

The broad peaks in the XRD patterns of B-ZSM-48 prepared in Examples 5 and 6 are consistent with the small crystal sizes of each preparation. FIGS. 8A, 8B, and 8C are SEMs showing the product borosilicate ZSM-48 from Examples 5 and 6, using 0.035 g, 0.07 g, and 1.05 g of KTB, respectively. In each case, the polycrystalline aggregates of the B-ZSM-48 material were about 1 μm in diameter, while each aggregate was comprised of individual crystals (crystallites) in the form of fine needles. Each individual needle-like crystal had a thickness in the range of about 5 nm to 50 nm.

Example 7

Synthesis of Platinum-Impregnated Borosilicate ZSM-48 (Pt/B-ZSM-48)

The solid product from Example 1 was calcined in a muffle furnace under an atmosphere of 2% oxygen/98% nitrogen heated to 595° C. at a rate of 1° C./min and held at 595° C. for five hours. The calcined molecular sieve was then exchanged into the ammonium form, as follows. An amount of ammonium nitrate equal to the mass of the molecular sieve to be exchanged was fully dissolved in an amount of deionized water ten times (10×) the mass of the molecular sieve. The molecular sieve was then added to the solution and the suspension was sealed in a glass vial and heated in an oven at 95° C. overnight. The vial was then removed from the oven, and the molecular sieve was recovered by filtration. The molecular sieve was washed with an amount of deionized water that is at least ten times (10×) the amount of deionized water used to prepare the ammonium exchange solution. The ammonium exchange procedure was repeated, on the same molecular sieve, and thereafter the ammonium-exchanged molecular sieve was allowed to dry in an oven at 95° C. overnight.

The ammonium-exchanged borosilicate ZSM-48 was then impregnated with platinum, as follows. The sample was suspended in water (9 g water per 1 g B-ZSM-48) and a solution of $Pt(NH_3)_4(NO_3)_2$ at a concentration which would provide 0.5 wt % Pt with respect to the dry weight of the borosilicate ZSM-48 was added to the suspension. The pH was adjusted to pH ~9 by the slow addition 0.15 N ammonium hydroxide solution, and the suspension was stirred for 48 hours at 100° C. After cooling, the mixture was filtered through a glass frit, washed with deionized water, and dried at 120° C. The sample was then calcined by slowly increasing the temperature to 300° C. in air and holding the temperature at 300° C. for 3 hours.

Example 8

Hydroconversion of N-Hexadecane Over Pt/B-ZSM-48

Platinum-impregnated borosilicate ZSM-48 (Pt/B-ZSM-48) prepared according to Example 7 was used for the selective hydroconversion of n-hexadecane under the following conditions. 0.5 g of Pt/B-ZSM-48 was loaded in the center of a 3 ft-long by 0.25 inch outside diameter stainless steel reactor tube (the borosilicate ZSM-48 catalyst was located centrally of the tube and extended about 1 to 2 inches in length) with alundum loaded upstream of the catalyst for preheating the feed (total pressure=1200 psig; down-flow hydrogen rate=160 mL/min (when measured at 1 atmosphere pressure and 25° C.); down-flow liquid feed rate=1 mL/hr). All materials were first reduced in flowing hydrogen at ~300° C. overnight.

Products were analyzed by on-line capillary gas chromatography (GC) once every thirty minutes. Raw data from the GC was collected by an automated data collection/processing system and hydrocarbon conversions were calculated from the raw data. The catalyst was tested at ~315° C. initially to determine the temperature range for the next set of measurements. The temperature was adjusted to give a conversion rate below 80%. Then the temperature was raised in ~5.6° C. (10° F.) increments until the conversion exceeded 80%. Eight on-line samples were collected at each temperature. Conversions were defined as the conversion of n-$C_{16}$ to products with carbon numbers below n-$C_{16}$, thus the iso-$C_{16}$ isomers were not counted as a converted product. Yields were expressed as weight percent materials other than n-$C_{16}$ and included iso-$C_{16}$ as a yield product.

The results are shown in Table 6 below. It can be seen that at n-$C_{16}$ conversion rates of 67-92% (371° C.-377° C.), borosilicate ZSM-48 of the invention showed good selectivity for the conversion of the n-$C_{16}$ feed to lighter, relatively large ($C_7$-$C_{13}$) n-alkane products (74-85% yield), with very low ($\leq 0.04$) i/n ratios over the range of $C_4$-$C_{10}$.

For the purposes of the n-hexadecane selective hydroconversion test of Example 8, the "n-paraffin selectivity" of the Pt/B-ZSM-48 catalyzed n-$C_{16}$ conversion process may be defined as the ratio of the lighter (i.e., $C_{\leq 15}$) normal paraffinic products to the net n-$C_{16}$ converted. Thus:

$$n\text{-paraffin selectivity} = \frac{(\text{net normal paraffin products } C_{<15}) \times 100}{\text{net normal } C_{16} \text{ consumed in the feed}}$$

Based on the above definition, the selectivity of the catalyst for the n-$C_{16}$ conversion to lighter n-paraffin products was more than 76% over the entire temperature range of about 310° C. to 400° C. (data not shown in Table 6), and the selectivity was >96% over the temperature range of about 377° C. to 400° C.

TABLE 6 n-Hexadecane hydroconversion test using Pt/B-ZSM-48
Measured Data

| | Temperature (° C.) | | | | | | | | | | |
|---|---|---|---|---|---|---|---|---|---|---|---|
| | 348.9 | 354.4 | 360.0 | 365.6 | 371.1 | 376.7 | 382.2 | 387.8 | 393.3 | 398.9 | 388.1 |
| % n-$C_{16}$ Conversion | 18.20 | 24.30 | 32.80 | 45.40 | 67.40 | 92.10 | 92.70 | 95.90 | 97.60 | 99.80 | 96.00 |
| % n-$C_{16}$ Selectivity | 87.2 | 88.4 | 89.1 | 90.0 | 92.0 | 97.0 | 96.4 | 96.9 | 97.7 | 100.0 | 96.9 |
| i/n Ratios | | | | | | | | | | | |
| $C_4$ i/n | 0.05 | 0.04 | 0.04 | 0.05 | 0.04 | 0.02 | 0.04 | 0.05 | 0.06 | 0.06 | 0.05 |
| $C_5$ i/n | 0.04 | 0.04 | 0.04 | 0.04 | 0.03 | 0.02 | 0.04 | 0.06 | 0.06 | 0.06 | 0.06 |
| $C_6$ i/n | 0.03 | 0.03 | 0.05 | 0.05 | 0.04 | 0.02 | 0.04 | 0.07 | 0.08 | 0.09 | 0.07 |
| $C_7$ i/n | 0.03 | 0.04 | 0.04 | 0.04 | 0.03 | 0.02 | 0.04 | 0.07 | 0.08 | 0.10 | 0.07 |
| $C_8$ i/n | 0.03 | 0.03 | 0.03 | 0.04 | 0.03 | 0.02 | 0.05 | 5.78 | 0.10 | 0.13 | 5.45 |
| $C_9$ i/n | 0.03 | 0.03 | 0.03 | 0.04 | 0.04 | 0.02 | 0.06 | 0.27 | 0.13 | 0.18 | 0.26 |
| $C_{10}$ i/n | 0.03 | 0.03 | 0.04 | 0.04 | 0.04 | 0.02 | 0.07 | 0.14 | 0.18 | 0.25 | 0.14 |
| $C_{11}$ i/n | 0.04 | 0.04 | 0.04 | 0.06 | | | | 0.15 | 0.22 | 0.34 | 0.15 |
| $C_{12}$ i/n | 0.050 | 0.050 | 0.050 | 0.060 | | | | 0.180 | 0.270 | 0.450 | 0.185 |
| $C_{13}$ i/n | 0.02 | 0.03 | 0.03 | 0.04 | | | | 0.17 | 0.31 | 0.62 | 0.18 |
| $C_4$-$C_{13}$ i/n | 0.03 | 0.04 | 0.04 | 0.05 | | | | 0.13 | 0.13 | 0.15 | 0.13 |
| Yields (%) | | | | | | | | | | | |
| $C_1$ | 0.29 | 0.28 | 0.31 | 0.32 | 0.24 | 0.12 | 0.28 | 0.44 | 0.51 | 0.67 | 0.44 |
| $C_2$ | 0.42 | 0.41 | 0.45 | 0.48 | 0.37 | 0.18 | 0.43 | 0.67 | 0.76 | 0.99 | 0.68 |
| $C_3$ | 2.39 | 2.42 | 2.48 | 2.59 | 1.93 | 0.95 | 2.17 | 3.30 | 3.70 | 4.68 | 3.32 |
| $C_4$s | 4.17 | 4.19 | 4.36 | 4.49 | 3.38 | 1.65 | 3.79 | 5.74 | 6.40 | 7.99 | 5.78 |
| $C_5$s | 5.61 | 5.62 | 5.86 | 6.09 | 4.61 | 2.24 | 5.15 | 7.81 | 8.64 | 10.62 | 7.86 |
| $C_6$s | 7.01 | 7.09 | 7.48 | 7.72 | 5.86 | 2.85 | 6.51 | 9.83 | 10.74 | 12.87 | 9.88 |
| $C_7$-$C_{13}$ | 67.33 | 68.35 | 68.16 | 68.32 | 73.81 | 85.24 | 76.81 | 69.11 | 66.89 | 62.06 | 68.98 |

TABLE 6-continued n-Hexadecane hydroconversion test using Pt/B-ZSM-48
Measured Data

| | Temperature (° C.) | | | | | | | | | | |
|---|---|---|---|---|---|---|---|---|---|---|---|
| | 348.9 | 354.4 | 360.0 | 365.6 | 371.1 | 376.7 | 382.2 | 387.8 | 393.3 | 398.9 | 388.1 |
| iC$_{16}$ | 12.76 | 11.61 | 10.88 | 10.00 | 8.04 | 3.03 | 3.60 | 3.09 | 2.30 | 0.05 | 3.04 |
| Unidentified | 0.00 | 0.03 | 0.01 | 0.00 | 1.76 | 3.74 | 1.28 | 0.01 | 0.06 | 0.07 | 0.01 |

What is claimed is:

1. A borosilicate ZSM-48 molecular sieve, characterized as polycrystalline aggregates of needle-like crystals, and wherein each needle-like crystal has a length of less than 200 nm, and a thickness in the range of about 5 nm to about 50 nm, having a mole ratio of between 40 and 400 of silicon oxide to boron oxide and having, after calcination, an X-ray diffraction pattern substantially as shown in the following Table:

| 2 Theta | d-spacing (Angstroms) | Relative Absolute Intensity$^{(\%)}$ |
|---|---|---|
| 7.6 ± 0.30 | 11.56 | W |
| 8.5 ± 0.30 | 10.38 | W |
| 15.2 ± 0.30 | 5.83 | W |
| 21.5 ± 0.30 | 4.14 | S |
| 23.1 ± 0.30 | 3.84 | S |
| 24.5 ± 0.30 | 3.63 | W |
| 25.0 ± 0.30 | 3.56 | W |
| 31.7 ± 0.30 | 2.82 | W. |

2. The borosilicate ZSM-48 molecular sieve according to claim 1, wherein the molecular sieve has a silicon oxide to boron oxide mole ratio of 40 to 200.

3. The borosilicate ZSM-48 molecular sieve according to claim 1, further comprising from about 0.05 to about 5 wt % of a Group 8-10 metal in combination with the molecular sieve, the metal selected from the group consisting of Pt, Pd, Rh, Ir, Ru, Os, and combinations thereof.

4. A borosilicate ZSM-48 molecular sieve, characterized as polycrystalline aggregates of needle-like crystals, and wherein each needle-like crystal has a length of less than 200 nm, and a thickness in the range of about 5 nm to about 50 nm, having a mole ratio of between 40 and 400 of silicon oxide to boron oxide and having, after calcination, an X-ray diffraction pattern substantially as shown in the following Table:

| 2 Theta | d-spacing (Angstroms) | Relative Absolute Intensity$^{(\%)}$ |
|---|---|---|
| 7.6 ± 0.30 | 11.56 | W |
| 8.5 ± 0.30 | 10.38 | W |
| 15.2 ± 0.30 | 5.83 | W |
| 21.5 ± 0.30 | 4.14 | S |
| 23.1 ± 0.30 | 3.84 | S |
| 24.5 ± 0.30 | 3.63 | W |
| 25.0 ± 0.30 | 3.56 | W |
| 31.7 ± 0.30 | 2.82 | W | wherein the molecular sieve is made by a process comprising contacting under crystallization conditions (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by the following structure:

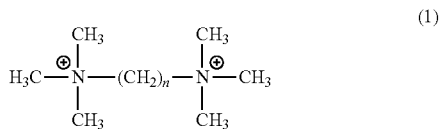

(1)

wherein n is an integer of from 8 to 12, inclusive.

5. The borosilicate ZSM-48 molecular sieve according to claim 4, wherein the molecular sieve has a silicon oxide to boron oxide mole ratio of 40 to 200.

6. The borosilicate ZSM-48 molecular sieve according to claim 4, further comprising from about 0.05 to about 5 wt % of a Group 8-10 metal in combination with the molecular sieve, the metal selected from the group consisting of Pt, Pd, Rh, Ir, Ru, Os, and combinations thereof.

7. The borosilicate ZSM-48 molecular sieve according to claim 4, wherein n is 8, 9, 11, or 12.

8. A method for preparing a borosilicate ZSM-48 molecular sieve, comprising contacting under crystallization conditions a reaction mixture comprising (1) at least one source of silicon oxide; (2) at least one source of boron oxide; (3) at least one source of an element selected from Groups 1 and 2 of the Periodic Table; (4) hydroxide ions; and (5) a structure directing agent selected from dications represented by the following structure:

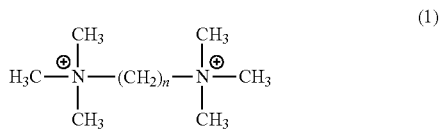

(1)

wherein n is an integer of from 8 to 12, inclusive and the molecular sieve is prepared from a reaction mixture comprising, in terms of mole ratios, the following:

| | |
|---|---|
| SiO$_2$/B$_2$O$_3$ | 15-80 |
| Q/SiO$_2$ | 0.1-0.3 |
| M/SiO$_2$ | 0.1-0.3 |
| OH$^-$/SiO$_2$ | 0.15-0.4 |
| H$_2$O/SiO$_2$ | 20-60 | wherein M is an element selected from the group consisting of elements from Groups 1 and 2 of the Periodic Table, and Q is the structure directing agent.

9. The method according to claim 8, wherein the molecular sieve has, after calcination, an X-ray diffraction pattern substantially as shown in the following Table:

| 2 Theta | d-spacing (Angstroms) | Relative Absolute Intensity(%) |
|---|---|---|
| 7.6 ± 0.30 | 11.56 | W |
| 8.5 ± 0.30 | 10.38 | W |
| 15.2 ± 0.30 | 5.83 | W |
| 21.5 ± 0.30 | 4.14 | S |
| 23.1 ± 0.30 | 3.84 | S |
| 24.5 ± 0.30 | 3.63 | W |
| 25.0 ± 0.30 | 3.56 | W |
| 31.7 ± 0.30 | 2.82 | W. |

10. The method according to claim 8, wherein the at least one source of an element selected from Groups 1 and 2 of the Periodic Table comprises an alkali metal halide.

11. The method according to claim 8, wherein the molecular sieve is characterized as polycrystalline aggregates of needle-like crystals, and wherein each needle-like crystal has a length of less than 200 nm, and a thickness in the range of about 5 nm to about 50 nm.

12. The method according to claim 8, wherein the molecular sieve has a mole ratio of between 40 and 400 of silicon oxide to boron oxide.

13. The method according to claim 12, wherein the molecular sieve has, after calcination, an X-ray diffraction pattern substantially as shown in the following Table:

| 2 Theta | d-spacing (Angstroms) | Relative Absolute Intensity(%) |
|---|---|---|
| 7.6 ± 0.30 | 11.56 | W |
| 8.5 ± 0.30 | 10.38 | W |
| 15.2 ± 0.30 | 5.83 | W |
| 21.5 ± 0.30 | 4.14 | S |
| 23.1 ± 0.30 | 3.84 | S |
| 24.5 ± 0.30 | 3.63 | W |
| 25.0 ± 0.30 | 3.56 | W |
| 31.7 ± 0.30 | 2.82 | W. |

14. The method according to claim 8, wherein n is 8, 9, 11, or 12.

* * * * *